United States Patent
Takano

(10) Patent No.: US 8,102,908 B2
(45) Date of Patent: Jan. 24, 2012

(54) WAVEFORM EQUALIZING DEVICE

(75) Inventor: Haruka Takano, Osaka (JP)

(73) Assignee: Panasonic Corporation, Osaka (JP)

( * ) Notice: Subject to any disclaimer, the term of this patent is extended or adjusted under 35 U.S.C. 154(b) by 664 days.

(21) Appl. No.: 12/282,271

(22) PCT Filed: Sep. 27, 2007

(86) PCT No.: PCT/JP2007/068840
§ 371 (c)(1),
(2), (4) Date: Sep. 9, 2008

(87) PCT Pub. No.: WO2008/041609
PCT Pub. Date: Apr. 10, 2008

(65) Prior Publication Data
US 2009/0067485 A1   Mar. 12, 2009

(30) Foreign Application Priority Data

Sep. 28, 2006  (JP) ................... 2006-265049

(51) Int. Cl.
*H03H 7/30* (2006.01)
*H03K 5/159* (2006.01)

(52) U.S. Cl. ......... 375/232; 375/231; 375/233; 375/234

(58) Field of Classification Search ................ 375/229, 375/231, 234, 236, 296
See application file for complete search history.

(56) References Cited

U.S. PATENT DOCUMENTS

| | | | |
|---|---|---|---|
| 4,727,424 A * | 2/1988 | Chao ................ | 348/614 |
| 5,668,833 A | 9/1997 | Kurokami et al. | |
| 6,449,368 B1 * | 9/2002 | Davis et al. ............ | 381/1 |
| 6,668,029 B1 * | 12/2003 | Koslov et al. ............ | 375/350 |
| 6,707,850 B1 | 3/2004 | Blake et al. | |
| 7,555,058 B2 * | 6/2009 | Hori et al. ............ | 375/296 |
| 2004/0032529 A1 | 2/2004 | Jeon et al. | |
| 2004/0146100 A1 | 7/2004 | Chang et al. | |
| 2005/0013450 A1 | 1/2005 | Kumazawa | |
| 2005/0175081 A1 | 8/2005 | Zhidkov | |
| 2006/0056536 A1 * | 3/2006 | Hori et al. ............ | 375/296 |
| 2006/0120475 A1 | 6/2006 | Zhidkov et al. | |

FOREIGN PATENT DOCUMENTS

| | | |
|---|---|---|
| JP | 2004-80789 | 3/2004 |
| JP | 2004-112792 | 4/2004 |
| JP | 2005-333302 | 12/2005 |
| JP | 2006-166454 | 6/2006 |
| WO | WO 02/084965 A1 | 10/2002 |
| WO | WO 02/087180 A1 | 10/2002 |

* cited by examiner

*Primary Examiner* — Khanh C Tran
*Assistant Examiner* — Qutbuddin Ghulamali
(74) *Attorney, Agent, or Firm* — McDermott Will & Emery LLP

(57) ABSTRACT

A waveform equalizing device for performing high-precision waveform equalization for an input signal and outputting the result as an output signal, includes: a FIR filter for performing convolution operation between the input signal and a plurality of tap coefficients; first and second slicers at least one of which makes decision on the value of the output signal; a first delay device for imparting a delay to the output of the second slicer; an IIR filter; and an addition section for summing the output of the FIR filter and the output of the IIR filter and outputting the sum as the output signal. The IIR filter includes first and second delay portions for respectively receiving the outputs of the first slicer and the first delay device and imparting delays, and performs convolution operation between the signal received by the first delay portion and tap coefficients for the first delay portion and between the signal received by the second delay portion and tap coefficients for the second delay portion.

14 Claims, 3 Drawing Sheets

WAVEFORM EQUALIZING DEVICE

RELATED APPLICATIONS

This application is the U.S. National Phase under 35 U.S.C. §371 of International Application No. PCT/JP2007/068840, filed on Sep. 27, 2007, which in turn claims the benefit of Japanese Application No. 2006-265049, filed on Sep. 28, 2006, the disclosures of which Applications are incorporated by reference herein.

TECHNICAL FIELD

The present invention relates to a waveform equalizing device for adaptively equalizing the waveform of a digital modulated signal.

BACKGROUND ART

A waveform equalizing device for equalizing the waveform of a digital modulated signal generally uses a finite impulse response (FIR) filter and an infinite impulse response (IIR) filter to perform equalization. To improve the equalization performance, a decision feedback equalizer (DFE) is used as the IIR filter. The DFE however generates error propagation and thus may cause degradation in equalization performance.

To address the above problem, Patent Document 1 discloses an equalizer in which a trellis decoder permitting use of a traceback path is employed to make value decision to thereby reduce error propagation and input data is delayed by a delay having arisen with the traceback path operation at the time of the value decision. Patent Document 2 discloses a device in which a DFE is coupled to a plurality of path memory outputs of a trellis decoder to allow the DFE to receive firm decision results and thus reduce error propagation. In this way, by use of a trellis decoder, high-precision waveform equalization has been attained for a signal containing Gaussian noise.

Patent Document 1: International Publication No. WO2002/084965
Patent Document 2: International Publication No. WO2002/087180

DISCLOSURE OF THE INVENTION

Problems to be Solved by the Invention

A waveform equalizing device is required to exhibit high waveform equalization performance for, not only signals containing Gaussian noise and a static ghost, but also signals suffering from interference such as a dynamic ghost and containing a burst error. In the waveform equalizing device in Patent Document 1, however, error propagation occurs when waveform equalization is performed for a signal containing a burst error, causing degradation in waveform equalization performance.

A waveform equalizing device must be designed to be as small in size as possible because the circuit area of the waveform equalizing device is highly influential on the circuit area of a demodulation circuit. The waveform equalizing device in Patent Document 1 is however large in circuit area with a number of components required for a FIFO (first in, first out) buffer, a delay-imparting filter and the like to enhance the precision of the trellis decoder. The waveform equalizing device in Patent Document 2 is also large in circuit area because of its increased number of path memories.

An object of the present invention is performing high-precision waveform equalization for both a signal containing Gaussian noise and a signal containing a burst error.

Means for Solving the Problems

The waveform equalizing device of the present invention is a waveform equalizing device for performing waveform equalization for an input signal and outputting the equalization result as an output signal, including: a finite impulse response (FIR) filter for performing convolution operation between the input signal and a plurality of tap coefficients and outputting the result; first and second slicers, at least one of the first and second slicers making decision on the value of the output signal, the slicers outputting the decision result if making decision and outputting the output signal if making no decision; a first delay device for imparting a delay to the output of the second slicer and outputting the result; an infinite impulse response (IIR) filter; an addition section for summing the output of the FIR filter and the output of the IIR filter and outputting the sum as the output signal; an error detection section for detecting an error in the output signal and outputting the detection result as error information; and a tap coefficient updating section for updating tap coefficients for the FIR filter and the IIR filter based on the error information, wherein the IIR filter includes: a first delay portion for receiving the output of the first slicer, imparting delays not more than a first delay different from one another to the received signal and outputting a plurality of resultant signals via a plurality of taps; and a second delay portion for receiving the output of the first delay device, imparting delays not more than a second delay different from one another to the received signal and outputting a plurality of resultant signals via a plurality of taps, the IIR filter performs convolution operation between the signal received by the first delay portion and tap coefficients corresponding to the plurality of taps of the first delay portion and between the signal received by the second delay portion and tap coefficients corresponding to the plurality of taps of the second delay portion, and outputs the result, and the first delay device imparts a delay so that the delay of the output of the first delay device with respect to the output signal is equal to the delay of a signal having the largest delay imparted thereto in the first delay portion with respect to the output signal.

With the above configuration, in which the IIR filter performs convolution operation for the output of the first slicer, it is possible to perform high-precision waveform equalization while suppressing the circuit area without entailing large delay. In particular, by use of a slicer low in noise occurrence as the first slicer, high-precision waveform equalization can be made even when a signal containing a burst error is received.

Effect of the Invention

According to the present invention, high-precision waveform equalization can be performed for any of a signal containing Gaussian noise and a signal containing a burst error. Also, tap coefficients for the IIR filter can be converged in a short time, and after the convergence, optimum equalization can be made using the output of the slicer.

DESCRIPTION OF REFERENCE NUMERALS

Figure 1:
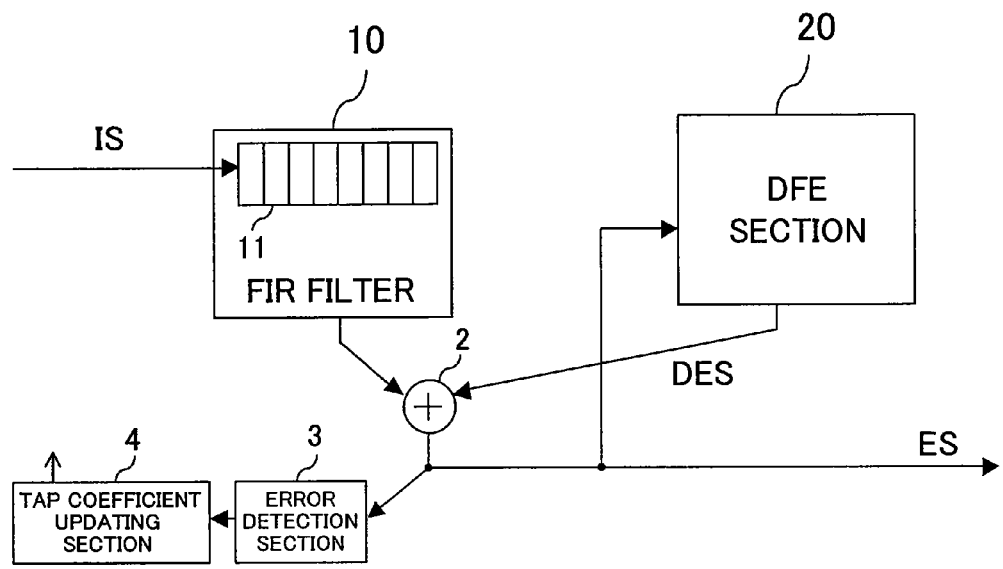
FIG. 1 is a block diagram of a waveform equalizing device of Embodiment 1.

2 Addition section
3 Error detection section
4 Tap coefficient updating section
6, 306 Control section
8 Averaging section
10 FIR filter
20, 220 DFE section
22A, 22B, 22C Slicer
24B, 24C Delay device
26, 226 IIR filter
32, 34, 36 Delay portion

BEST MODE FOR CARRYING OUT THE INVENTION

Hereinafter, embodiments of the present invention will be described with reference to the relevant drawings.

Embodiment 1

FIG. 1 is a block diagram of a waveform equalizing device of Embodiment 1. The waveform equalizing device of FIG. 1 includes a FIR filter 10, a decision feedback equalization (DFE) section 20, an addition section 2, an error detection section 3 and a tap coefficient updating section 4. This waveform equalizing device is used in a trellis coding system, especially in a receiver for receiving a vestigial-sideband (VSB) signal defined by the Advanced Television Systems Committee (ATSC).

Figure 2:
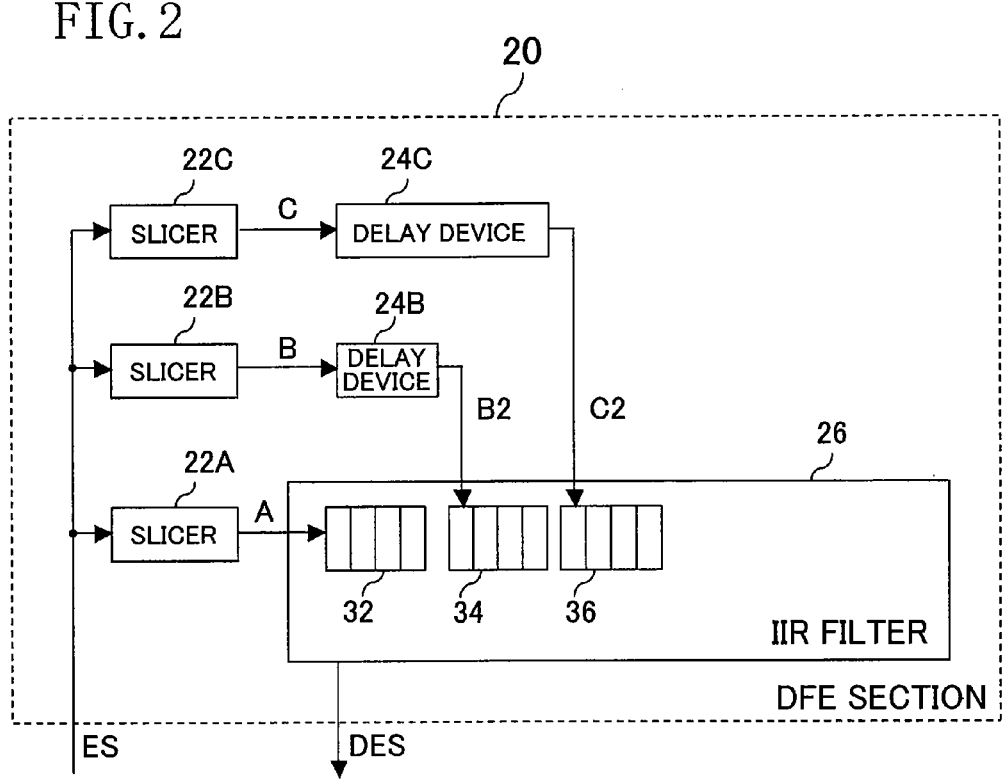
FIG. 2 is a block diagram of an example of a DFE section in FIG. 1.

FIG. 2 is a block diagram showing an exemplary configuration of the DFE section 20 in FIG. 1. The DFE section 20 includes a first slicer 22A, a second slicer 22B, a third slicer 22C, a first delay device 24B, a second delay device 24C and an IIR filter 26. The IIR filter 26 includes a first delay portion 32, a second delay portion 34 and a third delay portion 36.

The FIR filter 10 has a delay portion 11 that delays an input signal IS to obtain a plurality of tap values having delays different from one another. The FIR filter 10 performs convolution operation using the resultant tap values between the input signal IS and a plurality of tap coefficients respectively corresponding to the tap values, and outputs the result to the addition section 2.

The DFE section 20 delays an output signal ES to obtain a plurality of tap values, performs convolution operation between the output signal ES and a plurality of tap coefficients respectively corresponding to the tap values, and outputs the result to the addition section 2 as an output DES.

The addition section 2 sums the output of the FIR filter 10 and the output DES of the DFE section 20, and outputs the result as the output signal ES. The error detection section 3 detects an error in the output signal ES and outputs the resultant error to the tap coefficient updating section 4 as error information. The tap coefficient updating section 4 updates the tap coefficients for the FIR filter 10 and the IIR filter 26 based on the error information.

The slicer 22A outputs the output signal ES to the delay portion 32 as it is with no decision being made on the value. The slicer 22B, which has a trellis decoder, performs trellis decoding using symbol stream information to make decision on the value of the output signal ES and outputs the result to the delay device 24B. The slicer 22C outputs the output signal ES to the delay device 24C as it is with no decision being made on the value. Hereinafter, the outputs of the slicers 22A, 22B and 22C are respectively called slicer outputs A, B and C.

The delay portions 32, 34 and 36 of the IIR filter 26 respectively have a, b and c registers (a, b and c are natural numbers). Each register of the delay portions 32, 34 and 36 passes an inputted value to its next register at each symbol period $T_S$ of the input signal IS.

That is, the delay portion 32 imparts delays of $aT_S$ or less different by $T_S$ from one another to the slicer output A and outputs a plurality of resultant tap values. The delay portion 34 imparts delays of $bT_S$ or less different by $T_S$ from one another to an output B2 of the delay device 24B and outputs a plurality of resultant tap values. The delay portion 36 imparts delays of $cT_S$ or less different by $T_S$ from one another to an output C2 of the delay device 24C and outputs a plurality of resultant tap values.

The delay device 24B imparts a delay to the slicer output B and outputs the result to the delay portion 34 as the output B2. The delay device 24B imparts the delay so that the delay of the output B2 with respect to the output signal ES is equal to the delay of the signal obtained by imparting the largest delay to the slicer output A in the delay portion 32 with respect to the output signal ES. The delay device 24B may impart the delay $aT_S$ to the slicer output B and output the result.

The delay device 24C imparts a delay to the slicer output C and outputs the result to the delay portion 36 as the output C2. The delay device 24C imparts the delay so that the delay of the output C2 with respect to the output signal ES is equal to the delay of the signal obtained by imparting the largest delay in the delay portion 34 with respect to the output signal ES. The delay device 24C may impart a delay $(a+b)T_S$ to the slicer output C and output the result.

The IIR filter 26 multiplies the tap values outputted from the delay portions 32, 34 and 36 by their corresponding tap coefficients, sums the multiplication results and outputs the result as the output DES. The IIR filter 26 repeats this operation at each symbol period $T_S$ of the input signal IS.

In other words, the IIR filter 26 performs convolution operation between the slicer output A (output signal ES) and the tap coefficients corresponding to the taps of the delay portion 32, between the output B2 of the delay device 24B and the tap coefficients corresponding to the taps of the delay portion 34, and between the output C2 of the delay device 24C and the tap coefficients corresponding to the taps of the delay portion 36.

As described above, in Embodiment 1, the decision result from the slicer 22B is inputted into the delay portion 34 as a value close to the main signal that is greatly influential on the equalization performance of the IIR filter 26, and the output signal ES is inputted as it is into the delay portion 36 constituting a long delay loop. By configuring in this way, it is possible to attain high equalization performance while suppressing the influence of a slicer, like the slicer 22B, which may become a noise source depending on the input signal.

Also, with the slicers 22A, 22B and 22C being provided, slicers low in noise occurrence can be used for obtaining tap values at positions close to the main signal and obtaining tap values at positions corresponding to long delays. This permits high-precision waveform equalization even when signals containing a dynamic ghost and a burst error are received.

The slicer 22A and the slicer 22B may be interchanged with each other. In other words, the slicer 22A may have a trellis decoder to perform trellis decoding using symbol stream information to thereby make decision on the value of the output signal ES and output the result, and the slicer 22B may output the inputted signal as it is with no decision being made on the value of the inputted signal. In the case that the slicer 22B outputs the inputted signal as it is, high-precision waveform equalization can be attained even when a signal containing a burst error is received.

Alternatively, one of the slicers 22A and 22B may perform trellis decoding as described above, and the other may perform a method different from this such as 8-value hard decision or 16-value hard decision to make decision on the value of the output signal ES and output the decision result.

Otherwise, the slicers 22A to 22C may limit an inputted value falling outside a predetermined range to a value falling within the predetermined range and output the result.

Embodiment 2

Figure 3:
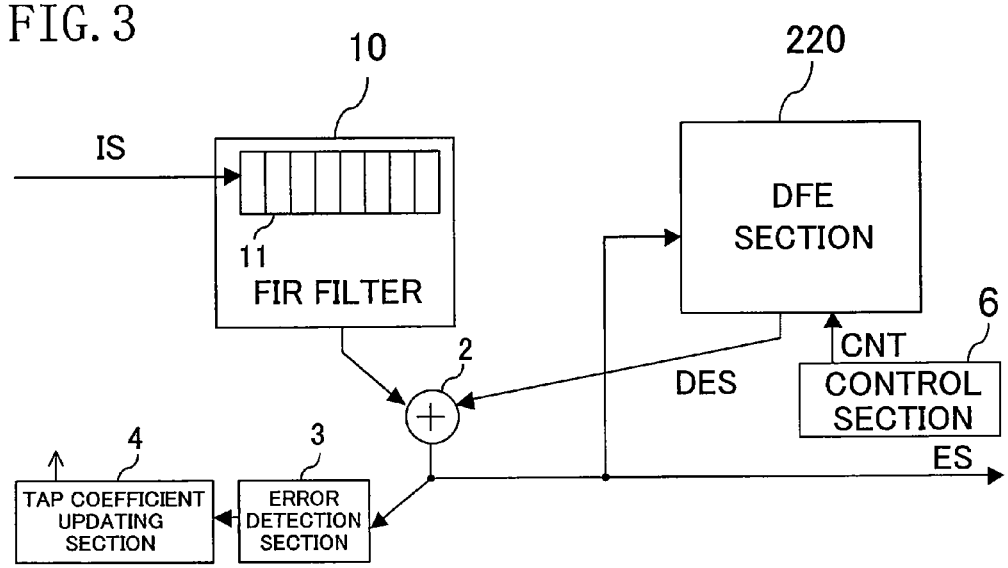
FIG. 3 is a block diagram of a waveform equalizing device of Embodiment 2.

FIG. 3 is a block diagram of a waveform equalizing device of Embodiment 2. The waveform equalizing device of FIG. 3 is different from the waveform equalizing device of FIG. 1 in including a DFE section 220 in place of the DFE section 20 and further including a control section 6. It is assumed in this embodiment that the slicer 22A does not make decision on the value of the output signal ES while the slicer 22B makes decision on the value of the output signal ES.

The control section 6 measures the elapsed time from the start of operation of the waveform equalizing device of FIG. 3 by counting pulses of a clock signal, for example, and compares the measured elapsed time with a predetermined threshold. For example, the control section 6 outputs 0 until the elapsed time reaches the predetermined threshold and 1 once it reaches the threshold, as a control signal CNT. The control section 6 also performs convolution operation between the input signal IS and a predetermined pattern signal to estimate the channel response.

Figure 4:
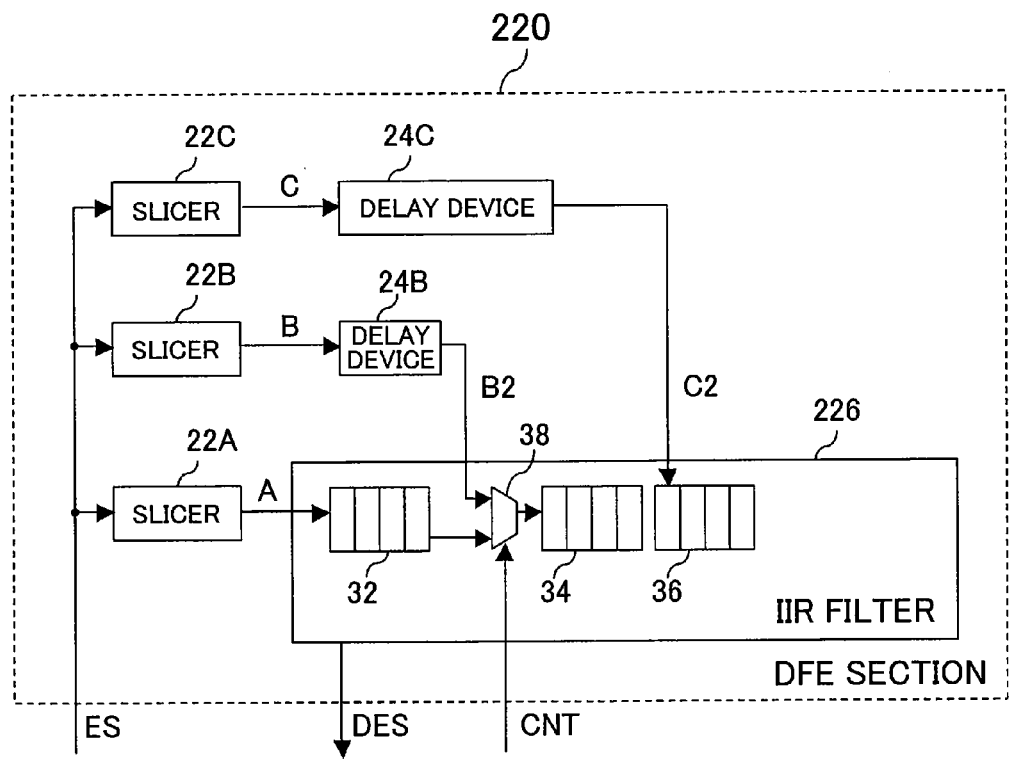
FIG. 4 is a block diagram of an example of a DFE section in FIG. 3.

FIG. 4 is a block diagram showing an exemplary configuration of the DFE section 220 in FIG. 3. The DFE section 220 is different from the DFE section 20 in including an IIR filter 226 in place of the IIR filter 26. The IIR filter 226 includes the delay portions 32, 34 and 36 and a selector 38.

The selector 38 selects one of the most delayed output of the delay portion 32 and the output B2 of the delay device 24B according to the control signal CNT and outputs the result to the delay portion 34. In this embodiment, the selector 38 selects the most delayed output of the delay portion 32 if the control signal CNT is 0 and selects the output B2 of the delay device 24B if the control signal CNT is 1. Except for this point, the DFE section 220 is substantially the same as the DFE section 20.

Hence, the IIR filter 226 imparts delays of $T_S$ to $(a+b)T_S$ to the slicer output A if the selector 38 selects the output of the delay portion 32, and imparts delays of $T_S$ to $aT_S$ to the slicer output A if the selector 38 selects the output B2 of the delay device 24B. In other words, the IIR filter 226 controls the maximum of the delays imparted to the slicer output A according to the control signal CNT.

As described above, in the waveform equalizing device of FIG. 3, the maximum delay imparted to the slicer output A is set at $(a+b)T_S$ at the initial operation stage of the waveform equalizing device, to avoid use of the output of the slicer 22B that makes decision on the value of the output signal ES. After the lapse of a predetermined time, the maximum delay imparted to the slicer output A is changed to $aT_S$ to use the output of the slicer 22B. This permits swift convergence of tap coefficients to optimum values even immediately after the start of operation when the reliability of the output of the slicer 22B is low.

In the above description, the IIR filter 226 imparted delays of $aT_S$ or less or delays of $(a+b)T_S$ or less to the slicer output A. Alternatively, arrangement may be made so that the maximum of the delays imparted to the slicer output A may be switched in the range of 0 to $(a+b)T_S$ depending on the situation. In this case, when the maximum of the delays imparted to the slicer output A is $kT_S$ (k is a natural number), the maximum of the delays imparted to the output B2 of the delay device 24B should be $(a+b)T_S - kT_S$. That is, in the IIR filter 226, it is arranged so that the sum of the maximum of the delays imparted to the slicer output A by the delay portions 32 and 34 and the maximum of the delays imparted to the output B2 of the delay device 24B by the delay portions 32 and 34 is fixed.

Also, the control section 6 may lower the threshold with which the elapsed time is compared if all the absolute values of the differentials of the tap coefficients for the IIR filter 226 fall short of a predetermined value.

Alternatively, the control section 6 may lower the threshold with which the elapsed time is compared if the absolute value of the differential of the sum of the absolute values of the tap coefficients for the IIR filter 226 falls short of a predetermined value.

The output signal ES of the waveform equalizing device of FIG. 3 is supplied to an error correction section (not shown) that performs error correction for the output signal ES and counts the number of error-corrected bits. The control section 6 may lower the threshold with which the elapsed time is compared if the number of bits error-corrected by the error correction section within a predetermined time period falls short of a predetermined value.

Otherwise, the control section 6 may lower the threshold with which the elapsed time is compared if it is determined based on an estimated channel response that the ratio in size of a ghost signal to the main signal falls short of a predetermined value.

By changing the threshold in the manners described above, optimum waveform equalization can be made swiftly after the convergence of the tap coefficients for the IIR filter 226.

As described above, once the elapsed time reaches a predetermined threshold, the control section 6 increases the maximum of the delays imparted, by the IIR filter 226, to the decision result supplied from the slicer 22A or 22B whichever makes decision on the value of the output signal ES.

The slicer 22A may perform trellis decoding to make decision on the value of the output signal ES, and the slicer 22B may output the inputted signal as it is with no decision being made. In this case where the slicer 22A makes decision, the control section 6 outputs the controlling signal CNT (value 0 in this case) for increasing the maximum of the delays imparted to the slicer output A by the IIR filter 226 once the elapsed time reaches a predetermined threshold.

The control section 6 may output the control signal CNT for increasing the maximum of the delays imparted to the slicer output A by the IIR filter 226 when the slicer 22A makes decision or decreasing the maximum thereof when the slicer 22B makes decision if all the absolute values of the differentials of the tap coefficients for the IIR filter 226 fall short of a predetermined value.

Alternatively, the control section 6 may output the control signal CNT for increasing the maximum of the delays imparted to the slicer output A by the IIR filter 226 when the slicer 22A makes decision or decreasing the maximum thereof when the slicer 22B makes decision if the absolute value of the differential of the sum of the absolute values of the tap coefficients for the IIR filter 226 falls short of a predetermined value.

The control section 6 may otherwise output the control signal CNT for increasing the maximum of the delays imparted to the slicer output A by the IIR filter 226 when the slicer 22A makes decision or decreasing the maximum thereof when the slicer 22B makes decision if the number of bits error-corrected by an error correction section within a predetermined time period falls short of a predetermined value.

The control section 6 may otherwise output the control signal CNT for increasing the maximum of the delays imparted to the slicer output A by the IIR filter 226 when the slicer 22A makes decision or decreasing the maximum thereof when the slicer 22B makes decision if it is determined based on an estimated channel response that the ratio in size of a ghost signal to the main signal falls short of a predetermined value.

By outputting the control signal CNT in the manners described above, optimum waveform equalization can be performed for the input signal IS whatever type of signal it is.

Alteration to Embodiment 2

Figure 5:
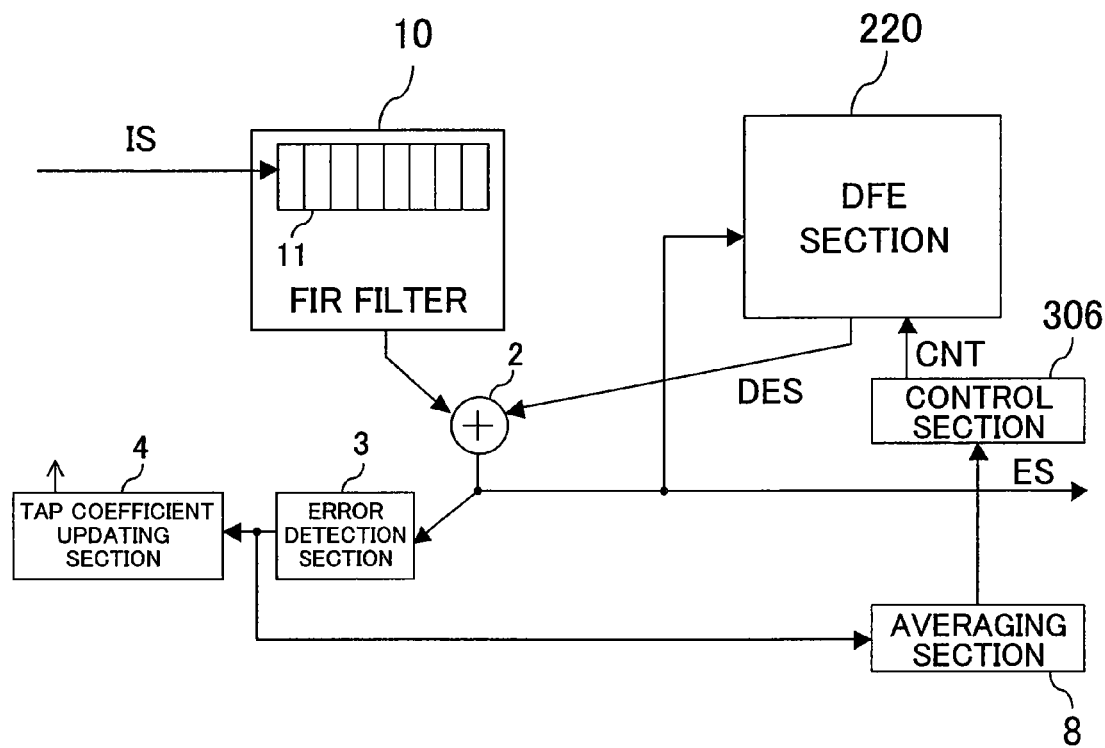
FIG. 5 is a block diagram of a waveform equalizing device of an alteration to Embodiment 2.

FIG. 5 is a block diagram of a waveform equalizing device of an alteration to Embodiment 2. The waveform equalizing device of FIG. 5 is different from the waveform equalizing device of FIG. 3 in including a control section 306 in place of the control section 6 and further including an averaging section 8.

The averaging section 8 computes the moving average of the error information outputted from the error detection section 3 for a predetermined time period and outputs the result to the control section 306. The control section 306 is substantially the same as the control section 6 in FIG. 3 except for changing the threshold with which the elapsed time is compared according to the resultant moving average. The control section 306 lowers the threshold with which the elapsed time is compared if the resultant moving average falls short of a predetermined value.

According to this alteration, optimum equalization can be made swiftly once the error is reduced and the tap coefficients are converged.

INDUSTRIAL APPLICABILITY

As described above, the present invention permits high-precision waveform equalization and thus is useful for a waveform equalizing device and the like.

The invention claimed is:

1. A waveform equalizing device for performing waveform equalization for an input signal and outputting the equalization result as an output signal, comprising:
an FIR (finite impulse response) filter for performing convolution operation between the input signal and a plurality of tap coefficients and outputting a result;
first and second slicers, one of the first and second slicers making decision on a value of the output signal and outputting a result of the decision, and the other one of the first and second slices outputting the output signal without making the decision;
a first delay device for imparting a delay to an output signal of the second slicer and outputting a resultant signal;
an IIR (infinite impulse response) filter;
an addition section for summing the result output from the FIR filter and an output of the IIR filter and outputting the sum as the output signal;
an error detection section for detecting an error in the output signal and outputting a detection result as error information; and
a tap coefficient updating section for updating tap coefficients for the FIR filter and the IIR filter based on the error information,
wherein the IIR filter comprises:
a first delay portion for receiving an output signal of the first slicer, imparting delays to the received output signal, and outputting a plurality of resultant signals via a plurality of taps, the delays being not more than a first delay and different from one another; and
a second delay portion for receiving the resultant signal output from the first delay device, imparting delays to the received resultant signal, and outputting a plurality of resultant signals via a plurality of taps, the delays being not more than a second delay and different from one another,
the IIR filter performs convolution operation between the received output signal received by the first delay portion and tap coefficients corresponding to the plurality of taps of the first delay portion and between the received resultant signal received by the second delay portion and tap coefficients corresponding to the plurality of taps of the second delay portion, and outputs an IIR result, and
the first delay device imparts a delay so that a delay of the resultant signal output from the first delay device with respect to the output signal is equal to a delay of a signal having the largest delay among the delays imparted by the first delay portion with respect to the output signal.

2. The waveform equalizing device of claim 1, further comprising a second delay device for imparting a delay to the output signal and outputting a delayed output signal, wherein:
the IIR filter further comprises a third delay portion for receiving the delayed output signal output from the second delay device, imparting delays, different from one another, to the received delayed output signal, and outputting a plurality of resultant signals via a plurality of taps,
the IIR filter performs convolution operation between the delayed output signal received by the third delay portion and tap coefficients corresponding to the plurality of taps of the third delay portion, and outputs a result, and
the second delay device imparts a delay so that a delay of the delayed output signal of the second delay device with respect to the output signal is equal to a delay of a signal having the largest delay among the delays imparted by the second delay portion with respect to the output signal.

3. The waveform equalizing device of claim 1, further comprising a control section for generating a control signal, wherein the IIR filter controls the maximum of the delays imparted, by the first delay portion, to the output signal of the first slicer, according to the control signal so that the sum of the maximum of the delays imparted to the output signal of the first slicer and the maximum of the delays imparted, by the second delay portion, to the resultant signal output from the first delay device become constant.

4. The waveform equalizing device of claim 3, wherein the control section measures elapsed time from start of operation of the waveform equalizing device and generates a signal for changing the maximum of the delays imparted to the output signal of the first slicer as the control signal when the elapsed time reaches a predetermined threshold.

5. The waveform equalizing device of claim 4, wherein the control section lowers the predetermined threshold when all of absolute values of the differentials of the tap coefficients for the IIR filter become less than a predetermined value.

6. The waveform equalizing device of claim 4, wherein the control section lowers the predetermined threshold when an absolute value of the differential of the sum of absolute values of the tap coefficients for the IIR filter becomes less than a predetermined value.

7. The waveform equalizing device of claim 4, wherein the control section lowers the predetermined threshold when a number of bits error-corrected by an error correction section for performing error correction for the output signal of the waveform equalizing device within a predetermined time period becomes less than a predetermined value.

8. The waveform equalizing device of claim 4, wherein the control section performs a convolution operation between the input signal and a predetermined pattern signal to estimate a channel response, and lowers the predetermined threshold value when it is determined based on the estimated channel response that a ratio in size of a ghost signal to a main signal becomes less than a predetermined value.

9. The waveform equalizing device of claim 4, further comprising an averaging section for computing the moving average of the error information,
wherein the control section lowers the predetermined threshold value when the moving average becomes less than a predetermined value.

10. The waveform equalizing device of claim 3, wherein the control section outputs a signal for changing the maximum of the delays imparted to the output signal of the first slicer as the control signal when all of absolute values of the differentials of the tap coefficients for the IIR filter become less than of a predetermined value.

11. The waveform equalizing device of claim 3, wherein the control section outputs a signal for changing the maximum of the delays imparted to the output signal of the first slicer as the control signal when an absolute value of the differential of the sum of the absolute values of the tap coefficients for the IIR filter becomes less than a predetermined value.

12. The waveform equalizing device of claim 3, wherein the control section outputs a signal for changing the maximum of the delays imparted to the output signal of the first slicer as the control signal when a number of bits error-corrected by an error correction section for performing error correction for the output signal of the waveform equalizing device within a predetermined time period becomes less than a predetermined value.

13. The waveform equalizing device of claim 3, wherein the control section estimates a channel response by performing a convolution operation between the input signal and a predetermined pattern signal, and outputs a signal for changing the maximum of the delays imparted to the output signal of the first slicer as the control signal when it is determined based on the estimated channel response that a ratio in size of a ghost signal to a main signal becomes less than a predetermined value.

14. A waveform equalizing device for performing waveform equalization for an input signal and outputting the equalization result as an output signal, comprising:
an FIR (finite impulse response) filter for performing convolution operation between the input signal and a plurality of tap coefficients and outputting a result;
first and second slicers each for making decision on a value of the output signal and outputting a result of the decision,
a first delay device for imparting a delay to an output signal of the second slicer and outputting a resultant signal;
an IIR (infinite impulse response) filter;
an addition section for summing the result output from the FIR filter and an output of the IIR filter and outputting the sum as an output signal;
an error detection section for detecting an error in the output signal and outputting a detection result as error information; and
a tap coefficient updating section for updating tap coefficients for the FIR filter and the IIR filter based on the error information, wherein:
the IIR filter comprises:
a first delay portion for receiving an output signal of the first slicer, imparting delays to the received output signal, and outputting a plurality of resultant signals via a plurality of taps, the delays being not more than a first delay and different from one another; and
a second delay portion for receiving the resultant signal output from the first delay device, imparting delays to the received resultant signal, and outputting a plurality of resultant signals via a plurality of taps, the delays being not more than a second delay and different from one another,
the IIR filter performs convolution operation between the received output signal received by the first delay portion and tap coefficients corresponding to the plurality of taps of the first delay portion and between the received resultant signal received by the second delay portion and tap coefficients corresponding to the plurality of taps of the second delay portion, and outputs an IIR result,
the first delay device imparts a delay so that a delay of the resultant signal output from the first delay device with respect to the output signal is equal to a delay of a signal having the largest delay among the delays imparted by the first delay portion with respect to the output signal, and
the first and second slicers make the decision on the value of the output signal by methods different from each other.

* * * * *